(12) United States Patent
Fujimoto et al.

(10) Patent No.: US 7,397,148 B2
(45) Date of Patent: Jul. 8, 2008

(54) VEHICULAR ANOMALY DIAGNOSIS SYSTEM

(75) Inventors: Takeshi Fujimoto, Obu (JP); Keiji Wakahara, Inazawa (JP)

(73) Assignee: DENSO Corporation, Kariya (JP)

( * ) Notice: Subject to any disclaimer, the term of this patent is extended or adjusted under 35 U.S.C. 154(b) by 575 days.

(21) Appl. No.: 10/705,963

(22) Filed: Nov. 13, 2003

(65) Prior Publication Data

US 2004/0099233 A1    May 27, 2004

(30) Foreign Application Priority Data

Nov. 25, 1920    (JP) .............................. 2002-341080

(51) Int. Cl.
*F02P 9/00*    (2006.01)
*H01H 47/00*    (2006.01)
*G01M 17/00*    (2006.01)

(52) U.S. Cl. ..................... 307/10.6; 361/162; 361/170; 361/187; 701/29; 701/34

(58) Field of Classification Search ................. 361/162; 307/10.6
See application file for complete search history.

(56) References Cited

U.S. PATENT DOCUMENTS 5,243,852 A * 9/1993 Morita ...................... 73/117.3
5,845,624 A * 12/1998 Ajima ........................ 123/494
6,072,403 A * 6/2000 Iwasaki et al. ............. 340/5.72
6,301,529 B1 * 10/2001 Itoyama et al. ............... 701/22
6,629,512 B2 * 10/2003 Iwatani et al. ............ 123/41.14
6,727,823 B2 * 4/2004 Ando et al. .................. 340/666
6,982,632 B2 * 1/2006 Nagasaka et al. ......... 340/426.3
2002/0005178 A1    1/2002 Iwatani et al ............ 123/41.14

* cited by examiner

*Primary Examiner*—Michael J Sherry
*Assistant Examiner*—Hal I Kaplan
(74) *Attorney, Agent, or Firm*—Nixon & Vanderhye P.C.

(57) ABSTRACT

An engine start is beforehand detected when a preparation operation to engine start is detected. When the preparation operation is detected based on a seat switch indicating that a driver seats himself on a driver seat, control of an electric current for a heater of an air/fuel ratio sensor is started. The air/fuel ratio sensor is then activated prior to the engine start. Failure diagnosis is conducted on a function for detecting the preparation operation. Namely, the seat switch is diagnosed as having failure, for instance, by the following. Even while a vehicle travels, the seat switch is in an OFF state indicating that no driver is seated. This structure can restrict the engine start without the air/fuel ratio sensor being pre-heated. It can also restrict deteriorating of emission.

10 Claims, 5 Drawing Sheets

VEHICULAR ANOMALY DIAGNOSIS SYSTEM

CROSS REFERENCE TO RELATED APPLICATIONS

This application is based on and incorporates herein by reference Japanese Patent Application No. 2002-341080 filed on Nov. 25, 2002.

FIELD OF THE INVENTION

The present invention relates to a vehicular anomaly diagnosis system for diagnosing a function of beforehand detecting an engine start of a vehicle. Here, the engine start is beforehand detected, for instance, when a door is opened and closed or a driver seats himself on a driver seat. Warming up an engine or components relating to the engine is executed prior to the engine start when the engine start is beforehand detected.

BACKGROUND OF THE INVENTION

Patent Application Publication of USP-2002/0005178 A1 discloses that a heat accumulating device is provided for executing warming-up of an engine of a vehicle prior to a engine start. The engine start is beforehand detected through opening and closing of a door or manipulation of an ignition key as a preparation operation to the engine start. The engine is then warmed up using the heat accumulating device prior to the engine start. Here, in particular, the engine start is prohibited until the warming-up is completed. The warming-up using the heat accumulating device is thereby securely executed.

However, failure of a function for detecting the preparation operation to the engine start naturally leads to incapability of detecting the preparation operation. Accordingly, the warming-up of the engine cannot be executed before the engine starts. Reducing emission thereby becomes difficult due to starting of the engine in low temperature.

SUMMARY OF THE INVENTION

It is an object of the present invention to provide a vehicular anomaly diagnosis system capable of detecting failure of a function for beforehand detecting a start of an engine of a vehicle.

To achieve the above object, an anomaly diagnosis system is provided with the following. Warming-up of one of an engine and a component relating to the engine can be executed. A pre-start state is detected by detecting a preparation operation for a start of the engine. Here, the warming-up is executed prior to the start of the engine when the pre-start state is detected. Furthermore, anomaly of the pre-start state can be detected. This structure of detecting the anomaly of the pre-start state enables the driver to be notified of the anomaly or the anomaly to be output into a terminal to be referred to by a maintenance shop. Unfavorable situations where the engine or the related components cannot be pre-heated prior to the engine start can be thereby restricted and emission can be also restricted.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
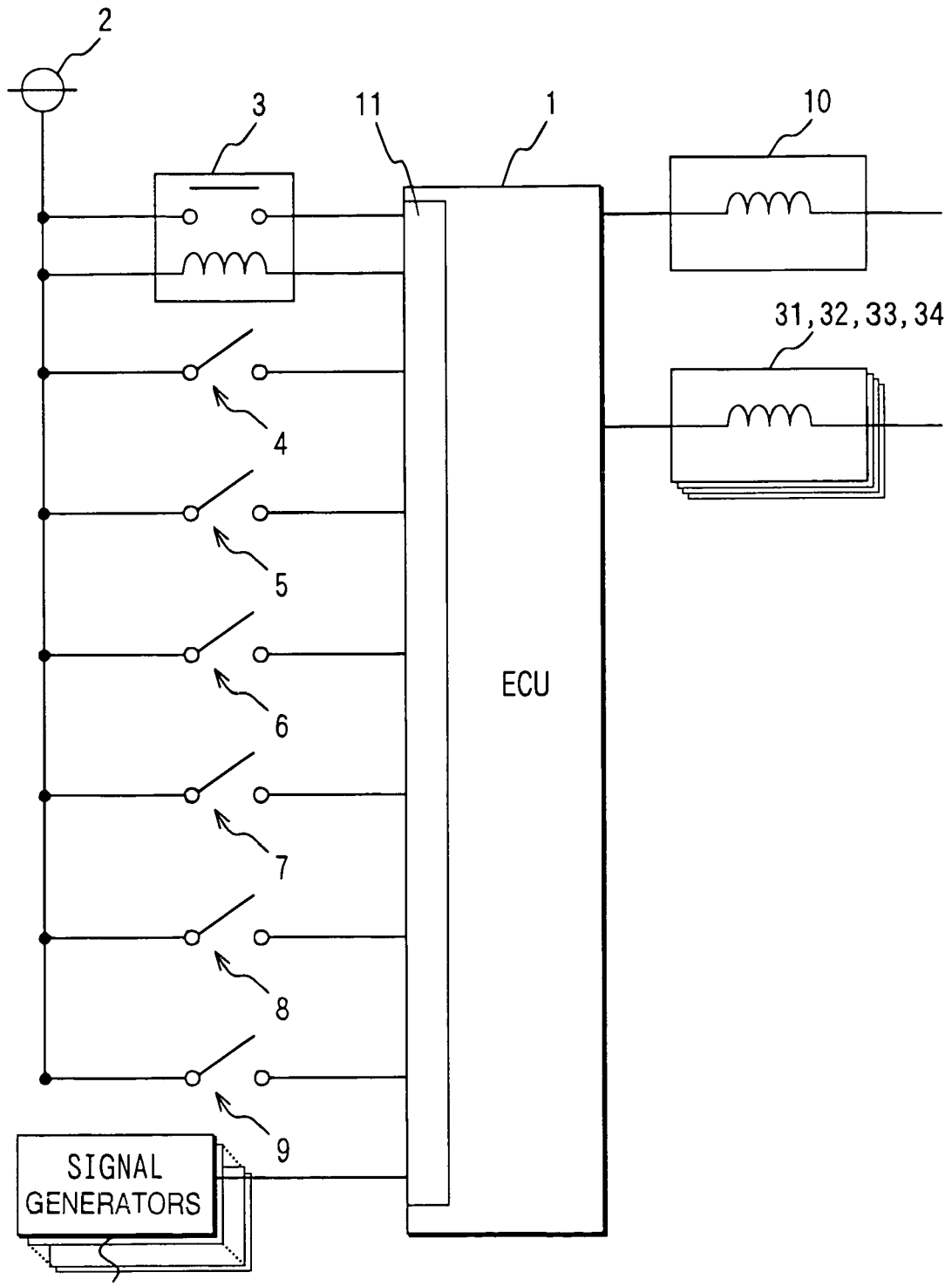
FIG. 1 is a diagram showing a schematic overall structure of an embodiment of the present invention.

FIG. 1 shows a schematic overall structure of an engine control unit (ECU) 1 according to an embodiment of the present invention. In this embodiment, the ECU 1 receives signals indicating cooling water temperature, air/fuel ratio, and the like of an engine of a vehicle, via a main relay control unit 11 that is to be described. Based on the received plural signals, the ECU 1 executes engine control by outputting, into plural actuators (not shown), signals for controlling the engine. The signals indicating (1) a vehicle speed, (2) an engine rotation speed, (3) an amount of air that is sucked into the engine, (4) a pressure detected by a suction pressure sensor provided in an exhaust path, (5) an opening degree of an accelerator, (6) an opening degree of a throttle, (7) a deceleration, (8) a depression of stepping of a clutch pedal, (9) a cooling water temperature, and (10) an air/fuel ratio are generated from corresponding signal generators 21, 22, 23, 24, 25, 26, 27, 28, 29, and 30, respectively.

When an air/fuel ratio sensor (not shown) remains at a low temperature at the time engine is started, feedback control cannot be executed even after the engine start. The engine control cannot be executed based on an air/fuel ratio, so that restricting emission becomes difficult. Therefore, the engine start is beforehand detected based on opening/closing of a door or sitting down on a driver seat. From then, warming-up is beforehand executed using a sensor heater 10 of an air/fuel ratio sensor until a driver actually starts the engine. This leads to enhancing an activated state of the air/fuel ratio sensor prior to the engine start in comparison with a case where the engine is started in low temperature. The feedback control is thereby quickly executed, so that the emission can be restricted.

The ECU 1 is equipped with the main relay control unit 11 for controlling a main relay 3. The main relay control unit 11 detects, through switches 4 to 9 or based on the signals 21 to 30, preparation operations that indicate that the engine is about to be started. When a preparation operation is detected, the ECU 1 controls the sensor heater 10 for warming-up the engine until the engine starts.

The switches 4 to 9 shown in FIG. 1 are as follows: an ignition switch 4 that is switched among OFF, ON, and START positions when a driver turns a key; an ignition key insertion switch 5 that is switched to an ON state when the driver inserts the key; a door-lock drive switch 6 that is switched to an ON state when a door-lock of the vehicle is driven; a door-handle manipulation switch 7 that is switched to an ON state when a door-handle is opened; a door opening/closing switch 8 that is switched to an ON state when a door is opened; and a seat switch 9 that is switched to an ON state when a driver is seated on a driver seat.

In the case where a detection function fails, the warming-up of the sensor heater 10 is started only when the driver turns the key for the ignition switch to the START position. The air/fuel ratio sensor is not pre-heated, so the feedback control is not started for a while and restricting the emission thereby becomes difficult. Accordingly, an object of the embodiment is to quickly detect the failure of the detection function of preparation operation to engine start.

Processing relating to detecting the failure of the detection function will be explained below with reference to FIGS. 2 to 7.

Figure 2:
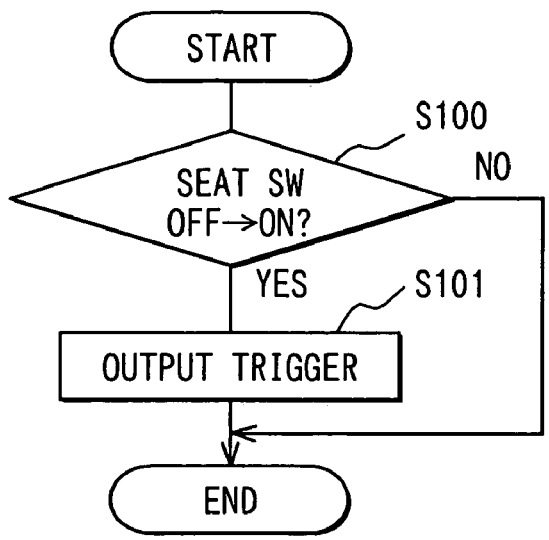
FIG. 2 is a flowchart diagram explaining processing of beforehand detecting of an engine start.

FIG. 2 shows processing of beforehand detecting of an engine start or of detecting a preparation operation. At Step S100, it is determined whether a state of being not seated shifts into a state of being seated based on a state of the seat switch 9. Here, the state of being not seated is a state where no driver is seated on the driver seat, while the state of being seated is a state where a driver is seated on the driver seat. When the state of being not seated is determined to not shift, the routine is terminated, bypassing Step S101. Otherwise, when the state of being not seated is determined to shift, the processing proceeds to Step S101. Here, since it is assumed that a preparation is detected, a pre-heat trigger signal indicating the start of heating of an air/fuel ratio sensor (pre-heating) is output. The routine is then terminated.

The above-mentioned processing is executed through hardware structure when the seat switch 9 is switched to an ON state. Namely, when the seat switch 9 is switched to an ON state, a battery 2 and the main relay control unit 11 are electrically connected with each other. Electric power from the battery 2 is then supplied to the main relay control unit 11. The main relay control unit 11 then determines that the pre-heating trigger signal is inputted.

Figure 3:
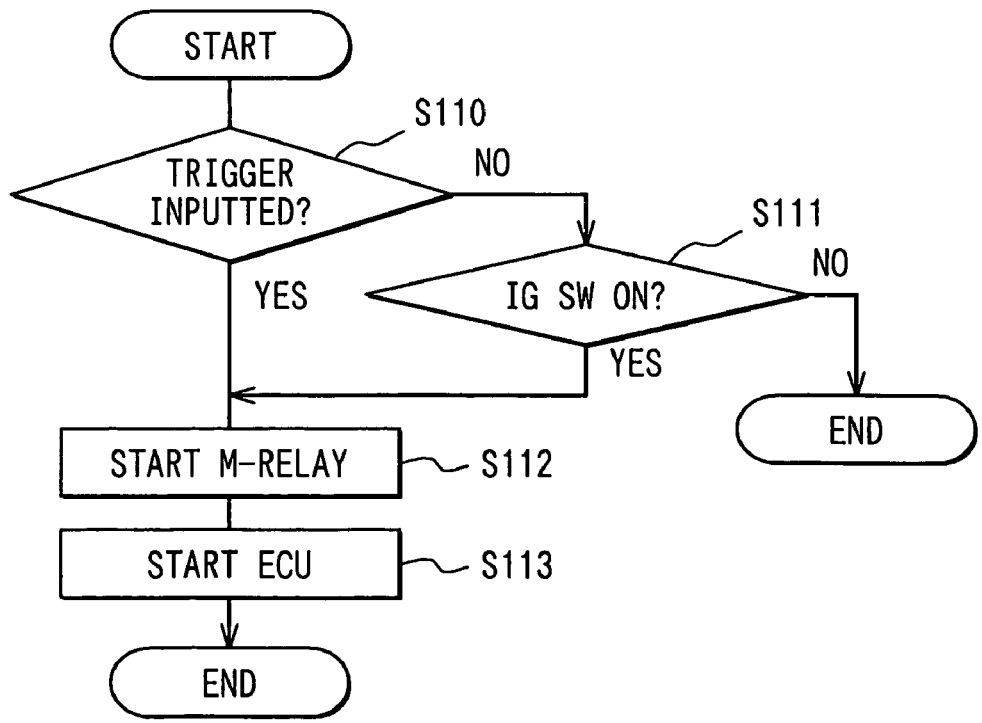
FIG. 3 is a flowchart diagram explaining processing for a main relay control unit to start an ECU.

Next, the processing executed by the main relay control unit 11 for starting the ECU 1 will be explained with reference to FIG. 3. At Step S110, it is determined whether the pre-heat trigger is inputted. When the pre-heat trigger signal is not inputted, the processing proceeds to Step S111 where it is determined whether the ignition switch 4 is in an ON position. When the ignition switch 4 is not in the ON position, the routine is terminated. Otherwise, when the ignition switch 4 is in the ON position, the processing proceeds to Step S112, where the main relay control unit 11 starts the main relay 3. The ECU 1 is thereby started at Step S113.

When the ECU 1 is started, the sensor heater 10 is pre-heated by a driver until the engine is actually started. The engine is started based on the state of pre-heating.

Figure 4:
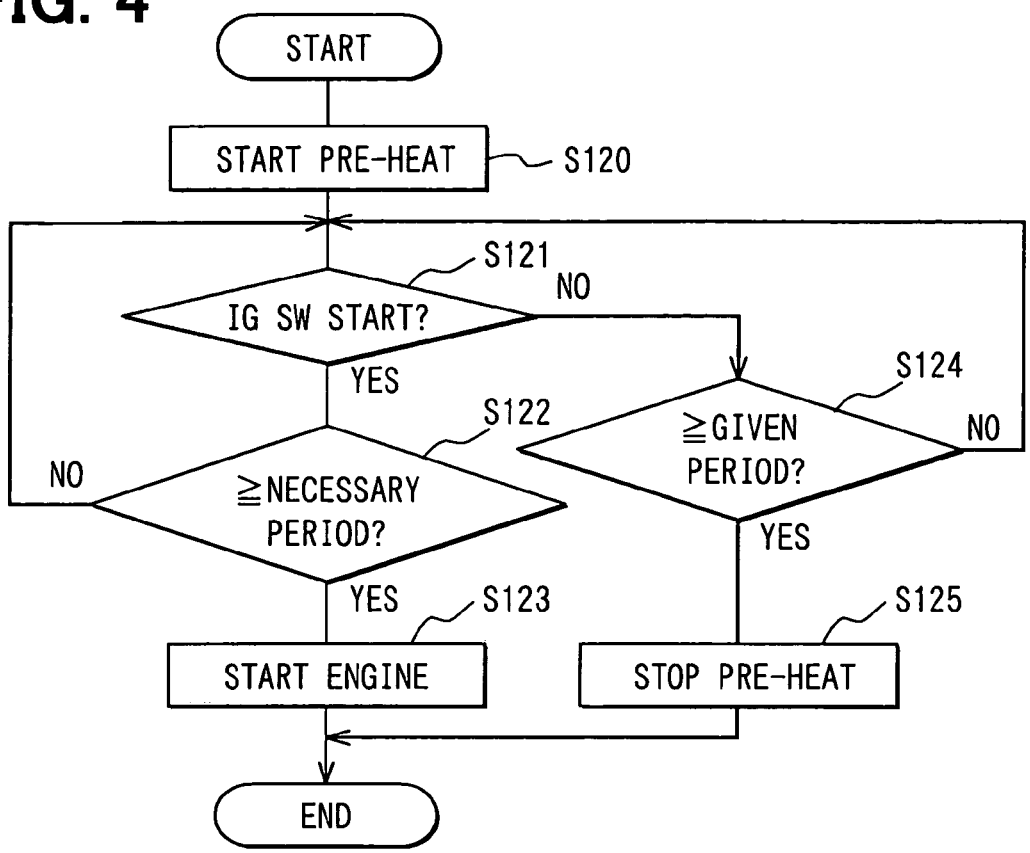
FIG. 4 is a flowchart diagram explaining processing of pre-heating a heater of an air/fuel ratio sensor until a driver actually starts an engine.

Processing performed by the ECU 1 will be explained with reference to FIG. 4. When the ECU 1 is started, pre-heating of the sensor heater 10 starts at Step S120. At Step S121, it is then determined whether the ignition switch 4 is set in START position. When the ignition switch 4 is set in the START position, the processing proceeds to Step S122. Here, it is determined whether a necessary period for heating the air/fuel ratio sensor has elapsed after the pre-heating starts. When the necessary period has not elapsed, the processing returns to Step S121 and the above-mentioned processing is repeated.

When the necessary period has elapsed, the processing proceeds to Step S123. Here, a starter (not shown) is compulsorily started to start the engine and the routine is then terminated.

By contrast, when the ignition switch 4 is not in the START position, the processing proceeds to Step S124. Here, it is determined whether a given period has elapsed after the pre-heating starts. The given period is set as being longer than the above necessary period. For instance, it can be set by considering consumption of the power of the battery 2 in a case where the engine is not actually started for a while.

When the given period has not elapsed, the processing returns to Step S121 and the above processing is repeated. Otherwise, when the given period has elapsed, the processing proceeds to Step S125. Here, the power supply to the sensor heater 10 is stopped to stop the pre-heating, and the routine is then terminated.

As explained above, in this routine, as the ECU 1 is started, the pre-heating is started. Even when the ignition switch 4 is in the START position, the engine does not start until the pre-heating is completed. When the pre-heating is completed, the engine is started. The air/fuel ratio sensor is thereby properly activated at the engine start, so that emission at the engine start can be restricted due to the feedback control. By contrast, when the ignition switch 4 is not in the START position, the pre-heating is started just after starting the ECU 1. However, the pre-heating is stopped after the given period, even if the engine is not yet started. The over-consumption of the power of battery 2 can be thereby restricted.

Next, the processing for diagnosing a failure of a function for beforehand detecting engine start will be explained with reference to FIG. 5. This routine shows failure diagnosis of the seat switch 9 while a driver is seated on a seat. A state where a driver is not seated on a seat even when a vehicle travels determines that the seat switch 9 fails.

At Step S130, it is determined whether a period for which a vehicle speed (shown in FIG. 1) exceeds a given speed is greater than or equal to a given period. The given speed can be any positive speed. When the period is less than the given period, the routine is terminated.

By contrast, when the period is greater than or equal to the given period, the vehicle is determined to be traveling. The processing proceeds to Step S131, where it is determined whether a driver is seated on a seat. When the driver is determined to be seated, the processing then proceeds to Step S133. Here, since the driver is seated while the vehicle is traveling, it (a diagnosis) is determined to be normal and the routine is then terminated. Otherwise, when no driver is determined to be seated, the processing proceeds to Step S132. Here, it (a diagnosis) is determined to be abnormal and the routine is then terminated.

Next, failure diagnosis while a driver is not seated will be explained with reference to FIG. 6. In this diagnosis, the seat switch 9 is determined to have failed when the seat switch 9 indicates the presence of the driver on the seat even after the driver retires from the vehicle.

At Step S150, it is determined whether the ignition switch 4 is in an OFF position. When the ignition switch 4 is not in the OFF position, the processing at Step S150 is repeated. When it is in the OFF position, the processing proceeds to Step S151.

At Step S151, it is determined whether the ignition key is drawn off from (i.e., drawn out from) an ignition insertion switch 5. When the ignition key is not drawn off, the processing at Step S151 is repeated. When the ignition key is drawn off, the processing proceeds to Step S152.

At Step S152, it is determined via the door opening/closing switch 8 whether a door is opened and closed. When the door is neither opened nor closed, the processing at Step S152 is repeated. When the door is opened and closed, the processing proceeds to Step S153.

At Step S153, it is determined through the door-lock drive switch 6 whether a door is locked from an outside of the vehicle. When no door is locked from the outside, the processing at Step S153 is repeated. When the door is locked from the outside, the processing proceeds to Step S154.

In the processing from Steps S150-S154, normal operations that a driver executes, such as stopping an engine or retiring from the vehicle, are determined. In particular, when the door is determined to be locked from the outside of the vehicle at Step S153, the driver is presumed not to be seated on the seat. Accordingly, at Step S154, it is determined via the seat switch 9 whether the driver is seated on the seat. When the driver is determined not to be seated, the seat switch 9 is determined to be normal at Step S155 and the routine is then terminated. When the driver is determined to be seated, the seat switch 9 is determined to be abnormal at Step S156 and the routine is then terminated.

In the above-mentioned routine, the failure diagnosis is conducted on the seat switch 9 after the driver stops the engine. The ECU 1 therefore needs to be running even when the driver stops the engine. Processing from the time the engine is stopped by the driver until the ECU 1 is stopped will be explained with reference to FIG. 7.

When at Step S140 the ignition switch 4 is affirmatively determined to be in the OFF position, the processing proceeds to Step S141. Otherwise, Step S140 is repeated. At Step S141, it is determined whether the failure diagnosis of the seat switch 9 explained in FIG. 6 is completed. When the failure diagnosis is completed, the processing proceeds to Step S143. Here, the ECU 1 is stopped and the routine is then terminated.

By contrast, if the failure diagnosis is not completed, the processing proceeds to Step S142. Here, it is determined whether a given period has elapsed after the failure diagnosis started. The given period is set for preventing over-consumption of the power of battery 2 even in an abnormal case where the failure diagnosis continues to be conducted without the ECU 1 stopping.

When the given period has not elapsed, Step S142 is repeated until completion of the failure diagnosis. Otherwise, when the given period has elapsed, the processing proceeds to Step S143. Here, the ECU 1 is stopped in order to prevent the over-consumption of the power of battery 2 and the routine is then terminated.

As explained above, in this embodiment, the preparation operation before the engine is started is detected based on the position of the seat switch 9. Here, in the case where the seat switch 9 is fixed in an ON or OFF state due to a failure, it is not detected whether a driver is seated on a seat. The failure diagnosis of the seat switch 9 can notify the driver of the failure of the seat switch 9. As a result, since replacement of the component causing the failure of the seat switch 9 can be completed, the engine start can be predicted. The engine is thereby prevented from starting in a condition where the air/fuel ratio sensor is not heated. This results in restriction of the emission.

(Modification 1)

In the above embodiment, whether a driver operates a vehicle is determined by whether a vehicle speed exceeds a given speed. Anomaly of the seat switch is determined when the seat switch indicates that no driver is seated even while the driver is operating the vehicle. In this embodiment, whether a driver operates a vehicle is determined by one of the following conditions: whether an engine rotation speed that is detected by a clunk sensor or the like is greater than or equal to a given speed; whether an amount of air that is sucked into the engine is greater than or equal to a given amount; whether a pressure detected by a suction pressure sensor provided in an exhaust path is greater than or equal to a given pressure; whether an opening degree of an accelerator operated by a driver is greater than or equal to a given degree; whether an opening degree of a throttle is greater than or equal to a given degree; whether a deceleration is greater than or equal to a given amount; and whether a depression of a clutch pedal is greater than or equal to a given amount. The above conditions can be used individually or in combination.

(Modification 2)

In the above embodiment, an anomaly of the seat switch 9 is determined when the seat switch 9 indicates that no driver is seated while the driver operates the vehicle. However, in the case where the seat switch 9 malfunctions due to electric noise while the driver operates the vehicle, it is mistakenly determined that no driver is seated on a seat. Therefore, in this embodiment, when an abnormal state continues for a given period, the anomaly of the seat switch 9 is finally determined. This restricts mistaken diagnosis of the anomaly even when the electric noise affects the seat switch 9.

The anomaly of the seat switch 9 can be also finally determined when an anomaly counter exceeds a given count. Here, the anomaly counter is continuously incremented while the anomaly is being detected.

(Modification 3)

In the above embodiment, an ON or OFF state of the seat switch 9 is used for detecting a preparation operation and an anomaly of the seat switch 9 is determined by comparing a state of the seat switch 9 with a state where the vehicle is operated.

In this embodiment, a preparation operation is detected based on whether an ignition key is inserted. The vehicle is determined to be in operation when the ignition key is in the ON position or START position. Whether or not an ignition key is inserted is determined using an ignition key insertion switch 5. When the ignition key is determined to be inserted while the ignition key is in the ON position or in the START position, a function of detecting a preparation operation to engine start is normal. By contrast, when the ignition key is determined not to be inserted while the ignition key is in the ON position or in the START position, a function of detecting a preparation operation to engine start is abnormal.

In this embodiment, whether a vehicle is in operation can be also detected based on one of the following conditions: whether a vehicle speed is greater than or equal to a given speed; whether an engine rotation speed that is detected by a clunk sensor or the like is greater than or equal to a given speed; whether an amount of air that is sucked into the engine is greater than or equal to a given amount; whether a pressure detected by a suction pressure sensor provided in an exhaust path is greater than or equal to a given pressure; whether an opening degree of an accelerator operated by a driver is greater than or equal to a given degree; whether an opening degree of a throttle is greater than or equal to a given degree; whether a deceleration is greater than or equal to a given amount; and whether a depression of a clutch pedal is greater than or equal to a given amount.

(Modification 4)

In the preceding embodiment, a preparation operation is detected based on whether an ignition key is inserted. However, in this embodiment, a preparation operation is detected based on an ON/OFF signal of a door opening/closing switch 8. Here, when a driver retires from a vehicle by opening and closing a door, a door-handle is also manipulated. Accordingly, in this embodiment, whether a door is actually opened and closed is determined based on ON and OFF signals of the door-handle manipulation switch 7. Therefore, an anomaly of the door opening/closing switch 8 is determined when the ON/OFF signals of the door opening/closing switch 8 are not detected for a period including time when the ON and OFF signals of the door-handle manipulation switch 7 are detected. An anomaly of a function of detecting a preparation operation to engine start can be thereby detected.

By contrast, the status of the door-handle manipulation switch 7 can be used instead of the door opening/closing switch 8. A preparation operation to engine start is detected based on an ON/OFF signal of a door-handle manipulation switch 7. An anomaly of the door-handle manipulation switch 7 is determined when the ON/OFF signals of the door-handle manipulation switch 7 are not detected for a period including time when the ON and OFF signals of the door opening/closing switch 8 are detected.

(Modification 5)

In the above embodiments, failure diagnosis is conducted based on a function of a preparation operation to engine start. In addition to that, when the anomaly is detected, a history of the anomaly can be stored in a backup RAM within the ECU 1.

(Modification 6)

Figure 5:
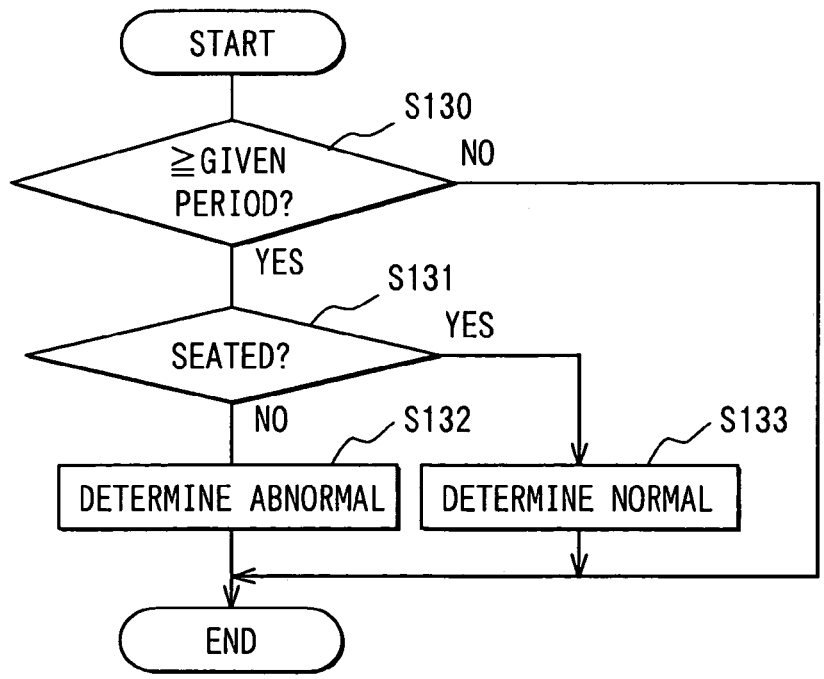
FIG. 5 is a flowchart diagram explaining seat switch failure detection that is processing of detecting failure when a driver is seated.
Figure 6:
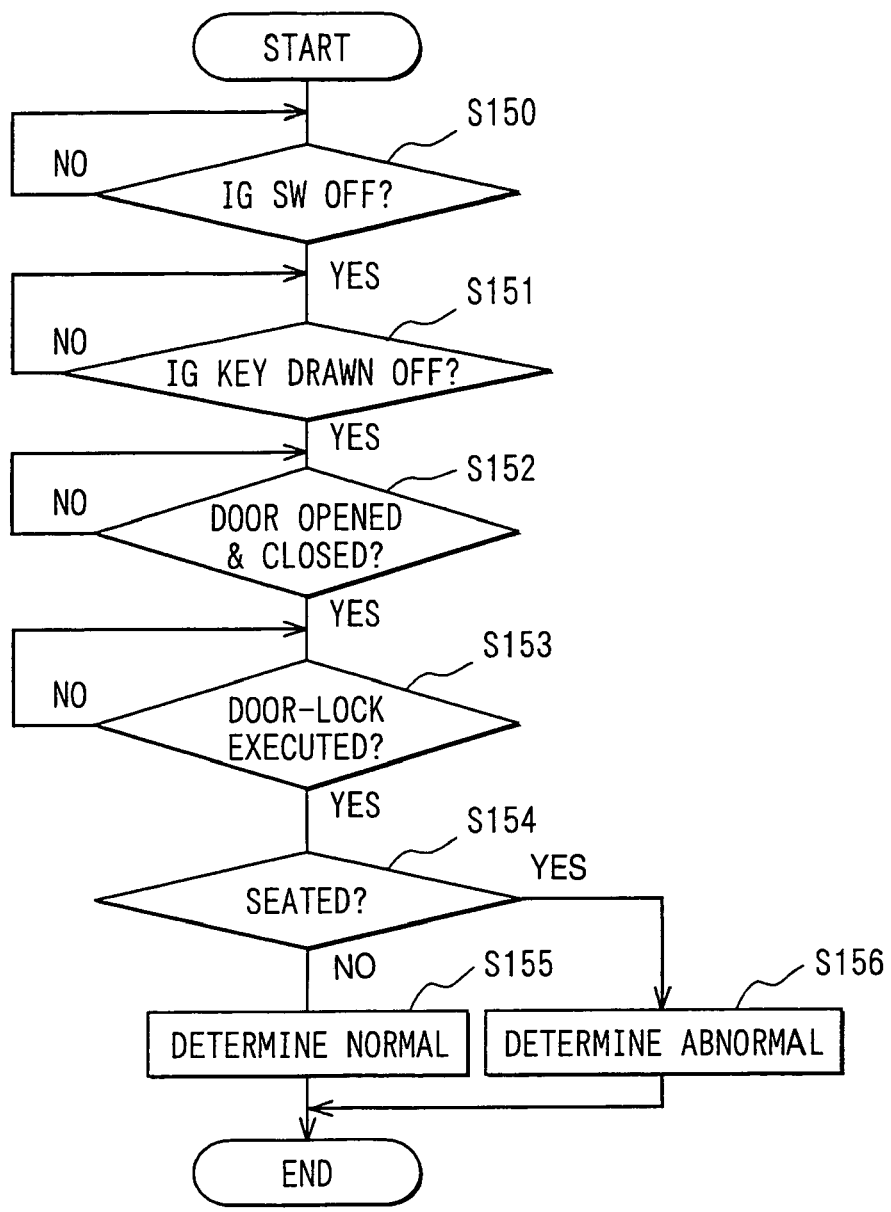
FIG. 6 is a flowchart diagram explaining seat switch failure detection that is processing of detecting failure when a driver is not seated.
Figure 7:
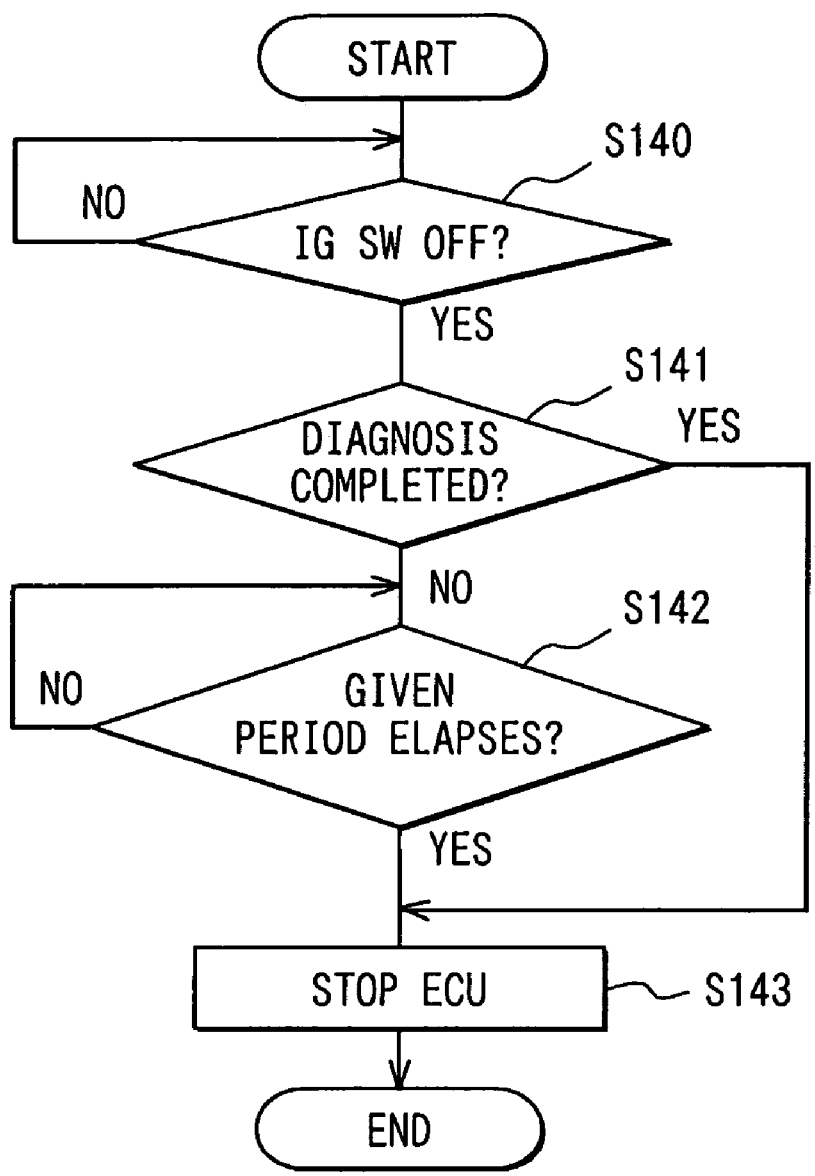
FIG. 7 is a flowchart diagram explaining processing of stopping an ECU.

In the above embodiments, the processing of failure detection is executed as shown in FIGS. 5 and 6. In this embodiment, the processing of the failure diagnosis can be continued without interruption until the failure diagnosis is eventually completed. Furthermore, when the failure diagnosis cannot be completed after a given period, the failure diagnosis can be compulsorily interrupted.

(Modification 7)

In the above embodiments, the sensor heater 10 provided in the air/fuel ratio sensor is pre-heated. However, when a suction pipe heater 31 is provided for heating a suction pipe, warming-up can be executed by controlling an electric current flowing through the suction pipe heater 31. Furthermore, a heater 32, 33, 34 can be provided in at least one of the following: a catalytic converter provided in the exhaust gas path for purifying harmful gas; a fuel injection valve provided for injecting fuel into the engine; and a canister provided for adsorbing vapor fuel vaporized from a fuel tank. The above heaters 31 to 34 are shown in FIG. 1.

Furthermore, each of the above-mentioned embodiments can be used in combination with another embodiment.

It will be obvious to those skilled in the art that various changes may be made in the above-described embodiments of the present invention. However, the scope of the present invention should be determined by the following claims.

What is claimed is:

1. An anomaly diagnosis system provided in a vehicle having an internal combustion engine and a component having an operative relationship with the engine, the anomaly diagnosis system comprising:
    warming-up means for executing warming-up of at least one of the engine and the component;
    pre-start state detecting means for detecting a pre-start state by detecting a preparation operation for a start of the engine, wherein the warming-up means executes the warming-up prior to the start of the engine when the pre-start state detecting means detects the pre-start state;
    anomaly detecting means for detecting an anomaly of the pre-start state detecting means; and
    vehicle state detecting means for detecting a vehicle state, wherein the pre-start state detecting means detects the pre-start state based on a given signal,
    the anomaly detecting means detects the anomaly of the pre-start state detecting means based on the given signal and the vehicle state detected by the vehicle state detecting means,
    the pre-start state detecting means detects the pre-start state based on an ON-signal or an OFF-signal of a driver seat switch as the given signal, wherein the ON-signal or OFF-signal of the driver seat switch indicates whether a driver is seated on a driver seat or not, respectively, and
    in a case where the OFF-signal of the driver seat switch is not detected and when it is detected that the driver retires from the vehicle, the anomaly detecting means detects an anomaly of the pre-start state detecting means.

2. An anomaly diagnosis system provided in a vehicle having an internal combustion engine and a component having an operative relationship with the engine, the anomaly diagnosis system comprising:
    warming-up means for executing warming-up of at least one of the engine and the component;
    pre-start state detecting means for detecting a pre-start state by detecting a preparation operation for a start of the engine, wherein the warming-up means executes the warming-up prior to the start of the engine when the pre-start state detecting means detects the pre-start state;
    anomaly detecting means for detecting an anomaly of the pre-start state detecting means; and
    vehicle state detecting means for detecting a vehicle state, wherein the pre-start state detecting means detects the pre-start state based on a given signal,
    the anomaly detecting means detects the anomaly of the pre-start state detecting means based on the given signal and the vehicle state detected by the vehicle state detecting means;
    the pre-start state detecting means detects the pre-start state based on a door opening/closing switch signal as the given signal, wherein the door opening/closing switch signal indicates whether a door of the vehicle is open or closed;
    a state of a door-handle manipulation switch is detected by the vehicle state detecting means, and
    when the pre-start state is not detected based on the door opening/closing switch signal for a given period including a given time at which a door-handle is operated based on the state of the door-handle manipulation switch, the anomaly detecting means detects an anomaly of the pre-start state detecting means.

3. An anomaly diagnosis system provided in a vehicle having an internal combustion engine and a component having an operative relationship with the engine, the anomaly diagnosis system comprising:
    warming-up means for executing warming-up of at least one of the engine and the component;
    pre-start state detecting means for detecting a pre-start state by detecting a preparation operation for a start of the engine, wherein the warming-up means executes the warming-up prior to the start of the engine when the pre-start state detecting means detects the pre-start state;
    anomaly detecting means for detecting an anomaly of the pre-start state detecting means; and
    vehicle state detecting means for detecting a vehicle state, wherein the pre-start state detecting means detects the pre-start state based on a given signal,
    the anomaly detecting means detects the anomaly of the pre-start state detecting means based on the given signal and the vehicle state detected by the vehicle state detecting means,
    the pre-start state detecting means detects the pre-start state based on a door-handle manipulation switch signal as the given signal, wherein the door-handle manipulation switch signal indicates an operation state of a door-handle of the vehicle;
    a state of a door opening/closing switch is detected by the vehicle state detecting means, and when the pre-start state is not detected based on the door-handle switch signal for a given period including a given time at which the door is operated based on the state of the door opening/closing switch, the anomaly detecting means detects an anomaly of the pre-start state detecting means.

4. An anomaly diagnosis system provided in a vehicle having an internal combustion engine and a component having an operative relationship with the engine, the anomaly diagnosis system comprising:

warming-up means for executing warming-up of at least one of the engine and the component;

pre-start state detecting means for detecting a pre-start state by detecting a preparation operation for a start of the engine, wherein the warming-up means executes the warming-up prior to the start of the engine when the pre-start state detecting means detects the pre-start state; and anomaly detecting means for detecting an anomaly of the pre-start state detecting means;

wherein, when the anomaly of the pre-start state detecting means continues for more than a given period, the anomaly detecting means diagnoses the pre-start state detecting means with a final anomaly.

5. An anomaly diagnosis system provided in a vehicle having an internal combustion engine and a component having an operative relationship with the engine, the anomaly diagnosis system comprising:

warming-up means for executing warming-up of at least one of the engine and the component;

pre-start state detecting means for detecting a pre-start state by detecting a preparation operation for a start of the engine, wherein the warming-up means executes the warming-up prior to the start of the engine when the pre-start state detecting means detects the pre-start state; and anomaly detecting means for detecting an anomaly of the pre-start state detecting means;

wherein the anomaly detecting means continuously increments a counter while the anomaly of the pre-start state detecting means is being detected, and wherein, when the counter exceeds a given count, the anomaly detecting means diagnoses the pre-start state detecting means with a final anomaly.

6. A method of diagnosing an anomaly in a vehicle having an internal combustion engine and a component having an operative relationship with the engine, the method comprising:

executing warm-up of at least one of the engine and the component;

detecting, with a pre-start state detector, a pre-start state by detecting a preparation operation for a start of the engine, wherein the warm-up is executed prior to the start of the engine when the pre-start state is detected; and detecting an anomaly of the pre-start state detector; and detecting a vehicle state, wherein the pre-start state detector detects the pre-start state based on a given signal, the anomaly of the pre-start state detector is detected based on the given signal and the detected vehicle state, the pre-start state detector detects the pre-start state based on an ON-signal or an OFF-signal of a driver seat switch as the given signal, wherein the ON-signal or OFF-signal of the driver seat switch indicates whether a driver is seated on a driver seat or not, respectively; and in a case where the OFF-signal of the driver seat switch is not detected and when it is detected that the driver retires from the vehicle, an anomaly of the pre-start state detector is detected.

7. A method of diagnosing an anomaly in a vehicle having an internal combustion engine and a component having an operative relationship with the engine, the method comprising:

executing warm-up of at least one of the engine and the component;

detecting, with a pre-start state detector, a pre-start state by detecting a preparation operation for a start of the engine, wherein the warm-up is executed prior to the start of the engine when the pre-start state is detected; and detecting an anomaly of the pre-start state detector; and detecting a vehicle state, wherein the pre-start state detector detects the pre-start state based on a given signal, the anomaly of the pre-start state detector is detected based on the given signal and the detected vehicle state, and the pre-start state detector detects the pre-start state based on a door opening/closing switch signal as the given signal, wherein the door opening/closing switch signal indicates whether a door of the vehicle is open or closed;

wherein a state of a door-handle manipulation switch is detected, and wherein, when the pre-start state is not detected based on the door opening/closing switch signal for a given period including a given time at which a door-handle is operated based on the state of the door-handle manipulation switch, the anomaly of the pre-start state detector is detected.

8. A method of diagnosing an anomaly in a vehicle having an internal combustion engine and a component having an operative relationship with the engine, the method comprising:

executing warm-up of at least one of the engine and the component;

detecting, with a pre-start state detector, a pre-start state by detecting a preparation operation for a start of the engine, wherein the warm-up is executed prior to the start of the engine when the pre-start state is detected; and detecting an anomaly of the pre-start state detector; and detecting a vehicle state, wherein the pre-start state detector detects the pre-start state based on a given signal, the anomaly of the pre-start state detector is detected based on the given signal and the detected vehicle state, and the pre-start state detector detects the pre-start state based on a door-handle manipulation switch signal as the given signal, wherein the door-handle manipulation switch signal indicates an operation state of a door-handle of the vehicle;

wherein a state of a door opening/closing switch is detected, and wherein, when the pre-start state is not detected based on the door-handle switch signal for a given period including a given time at which the door is operated based on the state of the door opening/closing switch, an anomaly of the pre-start state detector is detected.

9. A method of diagnosing an anomaly in a vehicle having an internal combustion engine and a component having an operative relationship with the engine, the method comprising:

executing warm-up of at least one of the engine and the component;

detecting, with a pre-start state detector, a pre-start state by detecting a preparation operation for a start of the engine, wherein the warm-up is executed prior to the start of the engine when the pre-start state is detected; and detecting an anomaly of the pre-start state detector; and detecting a vehicle state, wherein the pre-start state detector detects the pre-start state based on a given signal, the anomaly of the pre-start state detector is detected based on the given signal and the detected vehicle state, and when the anomaly of the pre-start state detector continues for more than a given period, the pre-start state detector is diagnosed with an anomaly condition.

10. A method of diagnosing an anomaly in a vehicle having an internal combustion engine and a component having an operative relationship with the engine, the method comprising:

executing warm-up of at least one of the engine and the component;

detecting, with a pre-start state detector, a pre-start state by detecting a preparation operation for a start of the engine, wherein the warm-up is executed prior to the start of the engine when the pre-start state is detected; and detecting an anomaly of the pre-start state detector; and detecting a vehicle state, wherein the pre-start state detector detects the pre-start state based on a given signal, the anomaly of the pre-start state detector is detected based on the given signal and the detected vehicle state, and a counter is continuously incremented while the anomaly of the pre-start state detector is being detected, and when the counter exceeds a given count, the pre-start state detector is diagnosed with an anomaly condition.

* * * * *

UNITED STATES PATENT AND TRADEMARK OFFICE
CERTIFICATE OF CORRECTION

PATENT NO.        : 7,397,148 B2
APPLICATION NO.   : 10/705963
DATED             : July 8, 2008
INVENTOR(S)       : Fujimoto et al.

It is certified that error appears in the above-identified patent and that said Letters Patent is hereby corrected as shown below:

On the Title Page, item [30], left-hand column, "Foreign Application Priority Data", please correct the text to read:

Nov. 25, 2002  (JP) .......................................................2002-341080

Signed and Sealed this

Second Day of September, 2008

JON W. DUDAS
*Director of the United States Patent and Trademark Office*